United States Patent
Menon et al.

(10) Patent No.: US 12,530,576 B2
(45) Date of Patent: Jan. 20, 2026

(54) ACCOUNTING FOR LONG-TAIL TRAINING DATA THROUGH LOGIT ADJUSTMENT

(71) Applicant: Google LLC, Mountain View, CA (US)

(72) Inventors: Aditya Krishna Menon, New York, NY (US); Sanjiv Kumar, Jericho, NY (US); Himanshu Jain, Jersey City, NJ (US); Andreas Veit, New York, NY (US); Ankit Singh Rawat, New York, NY (US); Gayan Sadeep Jayasumana Hirimbura Matara Kankanamge, Houston, TX (US)

(73) Assignee: Google LLC, Mountain View, CA (US)

( * ) Notice: Subject to any disclaimer, the term of this patent is extended or adjusted under 35 U.S.C. 154(b) by 1076 days.

(21) Appl. No.: 17/375,960

(22) Filed: Jul. 14, 2021

(65) Prior Publication Data

US 2023/0017505 A1 Jan. 19, 2023

(51) Int. Cl.
*G06N 3/08* (2023.01)
*G06F 18/2113* (2023.01)
*G06F 18/2415* (2023.01)
*G06F 18/2431* (2023.01)

(52) U.S. Cl.
CPC .......... *G06N 3/08* (2013.01); *G06F 18/2113* (2023.01); *G06F 18/2415* (2023.01); *G06F 18/2431* (2023.01)

(58) Field of Classification Search
CPC ... G06N 3/08; G06F 18/2113; G06F 18/2415; G06F 18/2431
See application file for complete search history.

(56) References Cited

U.S. PATENT DOCUMENTS 6,728,690 B1 * 4/2004 Meek .................. G06N 3/08
706/12

OTHER PUBLICATIONS

Nguyen-Trang, T., & Vo-Van, T. (May 2016). A new approach for determining the prior probabilities in the classification problem by Bayesian method. Advances in Data Analysis and Classification, 11, 629-643. (Year: 2016).*

Zhou, B., Cui, Q., Wei, X. S., & Chen, Z. M. (Jun. 2020). Bbn: Bilateral-branch network with cumulative learning for long-tailed visual recognition. In Proceedings of the IEEE/CVF conference on computer vision and pattern recognition (pp. 9719-9728). (Year: 2020).*

Kim, Y., & Zhang, O. (Jun. 2014). Credibility adjusted term frequency: A supervised term weighting scheme for sentiment analysis and text classification. arXiv preprint arXiv:1405.3518. (Year: 2014).*

Kull, M., & Flach, P. (Jan. 2015). Novel decompositions of proper scoring rules for classification: Score adjustment as precursor to calibration. In Machine Learning and Knowledge Discovery in Databases, ECML PKDD 2015, Porto, Portugal, 2015, Proceedings, Part I 15 (pp. 68-85). Springer Int. Pub. (Year: 2015).*

Bartlett et al., "Convexity, Classification, and Risk Bounds," Journal of the American Statistical Association, Jun. 16, 2005, 63 pages.

(Continued)

*Primary Examiner* — Michael J Huntley
*Assistant Examiner* — Maggie Thanh Maido
(74) *Attorney, Agent, or Firm* — Fish & Richardson P.C.

(57) ABSTRACT

Methods, systems, and apparatus, including computer programs encoded on computer storage media, for accounting for long-tail training data.

15 Claims, 3 Drawing Sheets

(56) References Cited

OTHER PUBLICATIONS

Bengio, et al., "Adaptive Importance Sampling to Accelerate Training of a Neural Probabilistic Language Model," Trans. Neur. Netw., Apr. 2008, p. 713-722.
Brodersen et al., "The Balanced Accuracy and it's Posterior Distribution," Proceedings of the International Conference on Pattern Recognition, Aug. 2010, p. 3121-3124.
Buda et al., "A Systematic Study of the Class Imbalance Problem in Convolutional Neural Networks," Neural Networks, 2018, p. 249-259.
Byrd et al., "What is the Effect of Importance Weighting in Deep Learning," Proceedings of the 36th International Conference on Machine Learning, Jun. 2019, p. 872-881.
Cao et al, "Learning Imbalanced Datasets with Label-Distribution-Aware Margin Loss," 33rd Conference on Neural Information Processing Systems, Oct. 27, 2019, 18 pages.
Cardie et al., "Improving Minority Class Prediction Using Case-Specific Feature Weights," Proceedings of the International Conference on Machine Learning, 1997, 10 pages.
Chan et al., "Learning with Non-Uniform Class and Cost Distributions: Effects and a Distributed Multi-Classifier Approach," KDD—98 Workshop on Distributed Data Mining, 1998, 27 pages.
Chawla et al., "Synthetic Minority Over-Sampling Technique," Journal of Artificial Intelligence Research (JAIR), Jun. 2002, pp. 321-357.
Cui et al., "Class-Balanced Loss Based on Effective Number of Samples," CVPR, 2019, 10 pages.
Dmochowski et al., "Maximum Likelihood in Cost-Sensitive Learning: Model Specification, Approximations and Upper Bounds," Journal of Machine Learning Research, 2010, p. 3313-3332.
Elkan, "The Foudnations of Cost-Sensitive Learning," Proceedings of the International Joint Conference on Artifical Intelligence, 2001, 6 pages.
Fan et al., "Learning with Average Top-K Loss," Advances in Neural Information Processing Systems, 2017, p. 497-505.
Fawcett et al., "Combining Data Mining and Machine Learning for Effective User Profiling," Proceedings of the ACM SIGKDD International Conference on Knowledge Discovery and Data Mining, 1996, p. 8-13.
Gneiting et al., "Probabilistic Forecasts, Calibration and Sharpness," Journal of the Royal Statistical Society: Series B Statistical Methodology, 2007, p. 243-268.
Gneiting et al., "Strictly Proper Scoring Rules, Prediction, and Estimation," Journal of the American Statistical Association, 2007, p. 359-378.
Guo et al., "On Calibration of Modern Neural Networks," Proceedings of the 34th International Conference on Machine Learning, 2017, p. 1321-1330.
Hazan et al., "Approximated Structed Prediction for Learning Large Scale Graphical Models," arXiv prints 1006.2899v2, Jul. 9, 2012, 5 pages.
He et al., "Deep Residual Learning for Image Recognition," 2016 IEEE Conference on Computer Vision and Pattern Recognition, 2016, 9 pages.
Hinton et al., "Distilling the Knowledge in a Neural Network," arXiv prints 1503.0253lvl, Mar. 9, 2015, 9 pages.
Iranmehr et al., "Cost-Sensitive Support Vector Machines," Neurocomputing, 2019, vol. 343, p. 50-64.
Jamal et al., "Rethinking Class-Balanced Methods for Long-Tailed Visual Recognition from a Domain Adaptation Perspective," Google Research, 2020, 10 pages.
Kang et al., "Decoupling Representation and Classifier for Long-Tailed Recognition," Eighth Conference on Learning Representations (ICLR), Feb. 19, 2020, 16 pages.
Khan et al., "Stiriking the Right Balance with Uncertainty," 2019 IEEE/CVF Conference on Computer Vision and Pattern Recognition, 2019, p. 103-112.
Kim et al., "Adjusting Decision Boundary for Class Imbalanced Learning," arXiv prints, Mar. 11, 2020, 11 pages.

King et al., "Logistic Regression in Rare Events Data," Political Analysis, 2001, vol. 9(2), p. 137-163.
Koltchinskii et al., "Some New Bounds on the Generalization Error of Combined Classifiers," Advances in Neural Information Processing Systems, MIT Press, 1997, p. 245-251.
Kubat et al., "Addressing the Curse of Imbalanced Training Sets: One Sided Selection," Proceedings of the International Conference on Machine Learning, 1997, 8 pages.
Kuleshov et al., "Accurate Uncertainties for Deep Learning Using Calibrated Regression," Proceedings of the 35th International Conference on Machine Learning, vol. 80 of Proceedings of Machine Learning Research, 2018, p. 2796-2804.
Lin, "A Note on Margin Based Loss Functions in Classification," Statistics & Probability Letters, vol. 68(1), p. 73-82.
Liu et al., "Large Scale Long-Tailed Recognition in an Open World," IEEE Conference on Computer Vision and Pattern Recognition, 2019, p. 2537-2546.
Liu et al., "Large-Margin Softmax Loss for Convolutional Neural Networks," Proceedings of the 33rd International Conference on Machine Learning, vol. 48, 2016, p. 507-516.
Liu et al., "Sphereface: Deep Hypersphere Embedding for Face Recognition," 2017 IEEE Conference on Computer Vision and Pattern Recognition, 2017, p. 6738-6746.
Mahajan et al., "Exploring the Limits of Weakly Supervised Pretraining," Computer Vision—ECCV 2018, 2018, p. 185-201.
Maloof et al., "Learning when Data Sets are Imbalanced and when costs are unequal and unknown," ICML 2003 Workshop on Learning from Imbalanced Datasets, 2003, 8 pages.
Menon et al., "On the Statistical Consistency of Algorithms for Binary Classification under Class Imbalance," Proceedings of the 30th International Conference on Machine Learning, 2013, p. 603-611.
Mikolov et al., "Distributed Representations of Words and Phrases and their Compositionality," Proceedings of the 26th International Conference on Neural Information Processing Systems, 2013, p. 3111-3119.
Morik et al., "Combining Statistical Learning with a knowledge-based approach—a case study in intensive care monitoring," Proceedings of the Sixteenth International Conference on Machine Learning, 1999, p. 268-277.
Muller et al., "When does label smoothing help," Advances in Neural Information Processing Systems 32: Annual Conference on Neural Information Processing Systems, 2019, p. 4696-4705.
Murphy et al., "A general framework for forecast verification," Monthly Weather Review, 1987, vol. 115(7), p. 1330-1338.
Pletscher et al., "Entropy and Margin Maximization for Structured Output Learning," Machine Learning and Knowledge Discovery in Databases, 2010, p. 83-98.
Provost, "Machine Learning from Imbalanced Data Sets 101," Proceedings of the AAAI—2000 Workshop on Imbalanced Data Sets, 2000, 3 pages.
Qiao et al., "Adaptive weighted lerarning for unbalanced multicategory classification," Biometrics, 2009, vol. 65(1), p. 159-168.
Reid et al., "Composite Binary Losses," Journal of Machine Learning Research, 2010, vol. 11, p. 2387-2422.
Shirazi et al., "Risk Minimization, Probability Elicitation and Cost Sensitive SVM's," Proceedings of the 27th International Conference on Machine Learning, 2010, p. 759-766.
Soudry et al., "The Implicit bias of gradient descent on separable data," Journal of Machine Learning Res., Jan. 2018, vol. 19(1), p. 2822-2878.
Szegedy et al., "Rethinking the Inception Architecture for Computer Vision," 2016 IEEE Conference on Computer Vision and Pattern Recognition, 2016, p. 2818-2826.
Tan et al., "Equalization Loss for Long-Tailed Object Recognition," Computer Vision Foundation, 2020, 10 pages.
Tatsumi et al., "Performance Evaluation of Multiobjective Multiclass Support Vector Machines Maximizing Geometric Margins," Numerical Algebra, Control and Optimization, 2011, vol. 1:151, 19 pages.
Van Horn et al., "The Devil is in the Tails: Fine Grained Classification in the Wild," arXiv print 1709.01450, 2017, 22 pages.

(56) References Cited

OTHER PUBLICATIONS

Wallace et al., "Class Imbalance," IEEE, 2011, 10 pages.
Wang et al., "Additive Margin Softmax for Face Verification," IEEE Signal Processing Letters, 2018, vol. 25(7), p. 926-930.
Wu et al., "Asymmetric Support Vector Machines: Low false-positive learning under the user tolerance," Proceedings of the 14th ACM SIGKDD International Conference on Knowledge Discovery and Data Mining, 2008, p. 749-757.
Xie et al., "The Logit Model and Response-based samples," Sociolofical Methods & Research, 1989, vol. 17(3), p. 283-302.
Ye et al., "Identifying and Compensating for Feature Deviation in Imbalanced Deep Learning," arXiv prints 2001.01385v3, Nov. 8, 2020, 18 pages.
Yi et al., "Sampling bias corrected neural modeling for large corpus item recommendations," Proceedings of the 13th ACM Conference on Recommender Systems, 2019, p. 269-277.
Zadrozny et al., "Learning and Making Decisions when costs and probabilities are both unknown," Proceedings of the Seventh ACM SIGKDD International Conference on Knowledge Discovery and Data Mining, 2001, p. 204-213.
Zhang et al., "Range loss for deep face recognition with long tailed training data," 2017 IEEE International Conference on Computer Vision, 2017, p. 5419-5428.
Zhang et al., "To balance or not to balance: A simple yet effective approach for learning with long-tailed distributions," arXiv prints 1912.04486v2, Mar. 10, 2020, 17 pages.
Zhang, "Class Size independent generalization analysis of some discriminative multicategory classification methods," Proceedings of the 17th International Conference on Neural Information Processing Systems, 2004, p. 1625-1632.
Zhou et al., "Training Cost-Sensitive Neural Networks with Methods Addressing the Class Imbalance Problem," IEEE Transactions on Knowledge and Data Engineering (TKDE), 2006, vol. 18(1), 14 pages.

* cited by examiner

ACCOUNTING FOR LONG-TAIL TRAINING DATA THROUGH LOGIT ADJUSTMENT

BACKGROUND

This specification relates to processing inputs using a classifier neural network.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that modifies the training of a classifier neural network, the inference process of the classifier neural network, or both to account for the training data used to train the classifier neural network being long-tailed. Long-trailed training data is data where most categories are associated with only a few training examples and the majority of the training examples in the training data are associated with one of a small subset of the categories.

Particular embodiments of the subject matter described in this specification can be implemented so as to realize one or more of the following advantages.

Training data for many real-world classification tasks tends to have a long-tailed or imbalanced distribution, in which many of the categories ("long-tail categories") have only a few training examples and the majority of the training examples in the training data are in one of a small subset of the categories ("dominant categories").

Owing to this paucity of training examples in the long-tail categories, conventional classification neural networks have difficulties generalizing on these long-tail categories. That is, after being trained, conventional classification neural networks that were trained on long-tail training data have difficulties accurately classifying new inputs that are in the long-tail categories but that may be different in some aspects from the training examples that were in the long-tail categories.

Moreover, conventional training on long-tail training data is susceptible to an undesirable bias towards dominant categories, i.e., conventional classifiers are trained to be more accurate for the dominant categories than for the other categories in the set.

These shortcomings make classifiers trained using conventional training techniques not suitable for deployment in many situations where accurately classifying examples from both dominant and long-tail categories is required, e.g., classification of certain image types, e.g., medical images or images captured by the sensors of a self-driving car or autonomous robot.

This specification describes techniques for accounting for the long-tail distribution of training to allow a classifier to be able to accurately classify and generalize well to new examples from both dominant categories and long-tail categories. In particular, this specification describes techniques for training a classifier on a modified loss function that results in a trained classifier that accurately classifies examples from both dominant and long-tail categories.

Additionally, this specification describes techniques for performing inference using a classifier that enables a classifier that has been trained using conventional techniques to accurately classify examples from both dominant and long-tail categories.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
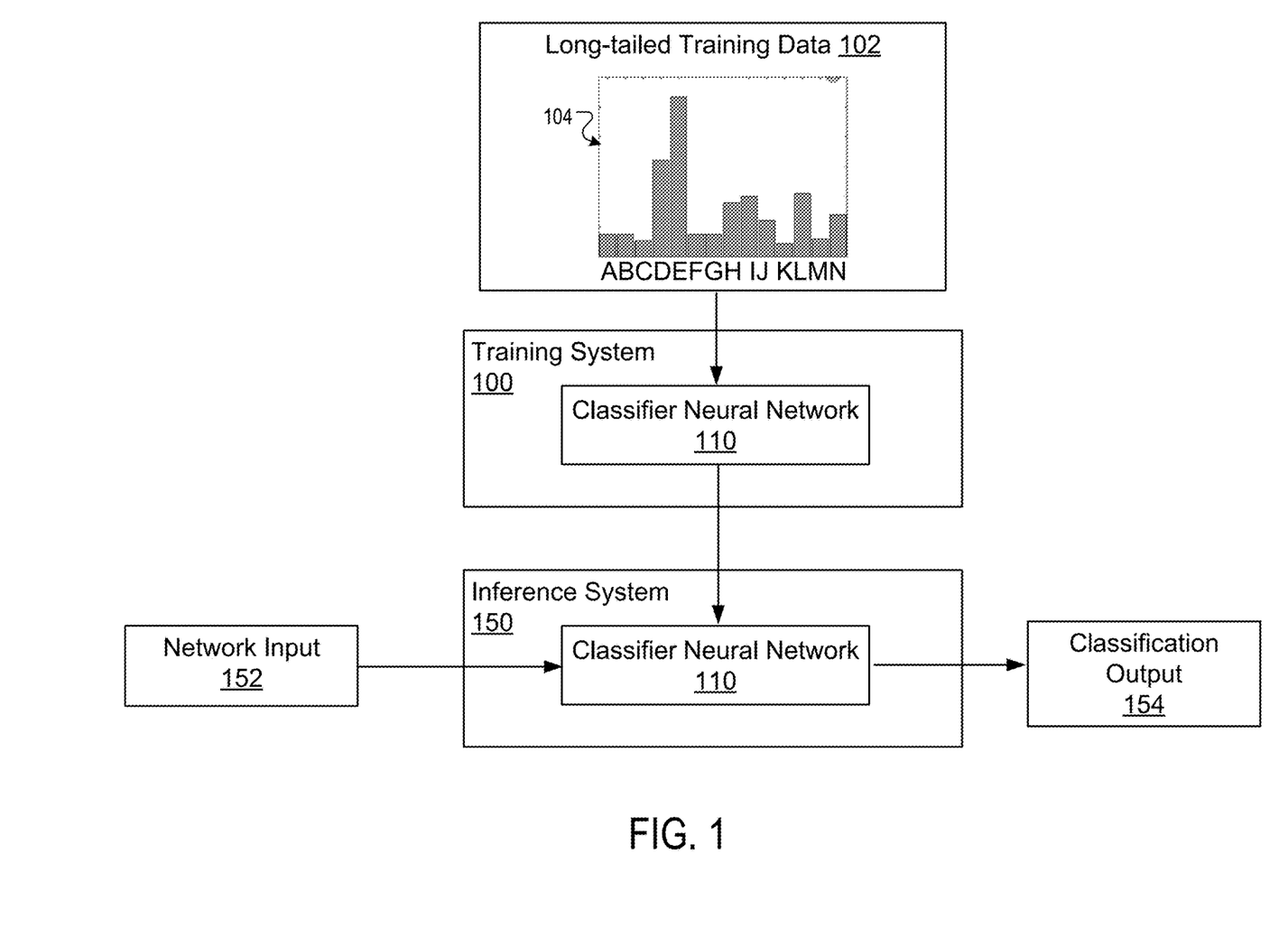
FIG. 1 shows an example training system and an example inference system.

FIG. 1 shows an example training system 100 and an example inference system 150.

The training system 100 and the inference system 150 are examples of systems implemented as computer programs on one or more computers in one or more locations, in which the systems, components, and techniques described below can be implemented. The system 100 and the system 150 can be implemented on the same set of one or more computers or on different sets of one or more computers in different locations.

The training system 100 trains a classifier neural network 110 on training data 102 to perform a classification task.

Once the classifier neural network 110 has been trained, the inference system 150 uses the trained classifier neural network 110 to perform inference, i.e., to receive a new network input 152 and to process the new network input 152 using the classifier neural network 10 to generate a classification output 154 for the classification task.

The classifier neural network 110 can be configured to perform any of a variety of classification tasks. As used in this specification, a classification task is any task that requires the neural network 110 to generate an output that includes a respective score for each of a set of multiple categories and to then select one or more of the categories as a "classification" for the network input using the respective scores.

One example of a classification task is image classification, where the input to the neural network 110 is an image, i.e., the intensity values of the pixels of the image, the categories are object categories, and the task is to classify the image as depicting an object from one or more of the object categories. That is, the classification output for a given input image is a prediction of one or more object categories that are depicted in the input image.

Another example of a classification task is text classification, where the input to the neural network 110 is text and the task is to classify the text as belonging to one of multiple categories. One example of such a task is a sentiment analysis task, where the categories each correspond to different possible sentiments of the task. Another example of such a task is a reading comprehension task, where the input text includes a context passage and a question and the categories each correspond to different segments from the context passage that might be an answer to the question. Other examples of text processing tasks that can be framed as classification tasks include an entailment task, a paraphrase task, a textual similarity task, a sentiment task, a sentence completion task, a grammaticality task, and so on.

Other examples of classification tasks include speech processing tasks, where the input to the neural network is audio data representing speech. Examples of speech processing tasks include language identification (where the categories are different possible languages for the speech), hotword identification (where the categories indicate whether one or more specific "hotwords" are spoken in the audio data), and so on.

As another example, the task can be a health prediction task, where the input is a sequence derived from electronic health record data for a patient and the categories are respective predictions that are relevant to the future health of the patient, e.g., a predicted treatment that should be prescribed to the patient, the likelihood that an adverse health event will occur to the patient, or a predicted diagnosis for the patient.

Thus, as described above, the neural network 110 is configured to process a network input to generate an output that includes a respective score for each of a set of multiple categories.

The neural network 110 can have any appropriate architecture that allows the neural network 110 to map a network input to an output that includes a respective score for each of the categories in the set.

As one example, when the inputs are images, the neural network 110 can be a convolutional neural network, e.g., a neural network having a ResNet architecture, an Inception architecture, an EfficientNet architecture, and so on, or a Transformer neural network, e.g., a vision Transformer.

As another example, when the inputs are text, features of medical records, or other sequential data, the neural network 110 can be a recurrent neural network, e.g., a long short-term memory (LSTM) or gated recurrent unit (GRU) based neural network, or a Transformer neural network.

The training data 102 includes multiple training examples. Each training example includes a training input and a label for the training input that identifies the ground truth category for the training input, i.e., the category into which the training input should be classified by performing the classification task on the training input.

More specifically, the training data 102 includes one or more training examples in each category of the set of multiple categories for which the neural network 110 is configured to generate scores. In this specification, a training example is "in" a given category only if the label in the training example indicates that the given category is the ground truth category for the training input in the training example.

In the example of FIG. 1, the set of multiple categories includes fourteen categories A-N. Thus, the classifier neural network 110 is configured to generate an output that includes a respective score for each of the categories A-N and the training data 102 includes one or more respective training examples in each of the categories A-N.

However, the training data 102 is "long-tailed training data." Long-tailed training data is training data that has a long-tailed or imbalanced distribution, in which many of the categories ("long-tail categories") have only a few training examples and the majority of the training examples in the training data are in one of a small subset of the categories ("dominant categories").

The distribution of the training data 102 in the example of FIG. 1 is represented as a bar graph diagram 104, where each bar corresponds to one of the categories A-N and the height of the bar represents the number of training examples that are in the corresponding category. As can be seen from the diagram 104, categories D and E are the dominant categories that have significantly larger numbers of training examples than any of the other categories. Categories A, B, C, F, G, K, and M, on the other hand, are the long-tail categories that have very small numbers of training examples (relative to D and E).

Owing to this paucity of training examples in the long-tail categories, conventional classification neural networks have difficulties generalizing on these long-tail categories. That is, after being trained, conventional classification neural networks that were trained on long-tail training data have difficulties accurately classifying new inputs that are in the long-tail categories but that may be different in some aspects from the training examples that were in the long-tail categories. Moreover, conventional training on long-tail training data is susceptible to an undesirable bias towards dominant categories, i.e., conventional classifiers are trained to be more accurate for the dominant categories than the other categories in the set.

To address these challenges, (i) the training system 100 can adapt the training of the classifier neural network 110 to account for the long-tail distribution of the training data 102, (ii) the inference system 100 can adapt how classification is performed after the classifier neural network 110 is trained, or (iii) both.

In particular, the training system 100 trains the classifier neural network 110 on the training data to determine trained values of the parameters ("network parameters") of the classifier neural network 110. In some implementations, the system 100 can resample the training data prior to the training, i.e., so that each category has at least a target proportion of the training examples in the resampled training data set.

In some implementations, the training system 100 trains the classifier neural network 110 using conventional supervised learning techniques. For example, the system 100 can train the neural network 110 to minimize a loss function that measures the cross-entropy loss between (i) a first probability distribution that assigns a one to the ground truth category for a given training example and a zero to all other categories and (ii) a second probability distribution generated from of scores for the set of categories generated by processing the given training input in the given training example using the classifier neural network 110. For example, the loss function can be the sum or the average of the cross-entropy losses for the training examples in a batch sampled from the training data.

Optionally, the loss function can also include one or more other terms, e.g., regularization terms or auxiliary loss terms.

Further optionally, during this training, the classifier neural network 110 can apply techniques to attempt to account for the long-tail distribution of the training data 102 while still training using the conventional cross-entropy-based loss function. For example, the system 100 can employ over-sampling or under-sampling techniques when selecting batches of training data for use in training the neural network 100. Over-sampling techniques sample training examples from long-tail categories more frequently during training, i.e., to be included in batches of training examples that are used to train the classifier neural network 100, than they would be sampled if training examples were sampled from a uniform distribution. Similarly, under-sampling techniques sample training examples from dominant categories less frequently during training than they would be sampled if training examples were sampled from a uniform distribution.

In some other implementations, the system 100 instead trains the classifier neural network 110 on the training data to minimize a logit adjusted loss function that accounts for the long-tail distribution of the training data 102.

Training the classifier neural network 110 using the logit adjusted loss function is described below with reference to FIG. 2.

In implementations in which the neural network 110 is trained using the logit adjusted loss function, at inference time, the inference system 150 classifies the new input 152 by processing the new input 152 using the trained classifier neural network 110 to generate a respective score for each category in the set and then selecting one or more highest scoring categories as the classification for the input 152. Thus, the classification output 154 identifies one or more highest scoring categories according to the scores generated by the neural network 110.

In implementations in which the neural network 110 is not trained using the logit adjusted loss function, at inference time, the inference system 150 classifies the new input 152 by processing the new input 152 using the trained classifier neural network 110 to generate a respective score for each category in the set and then adjusting each score to account for the long-trailed distribution of the training data 102 that was used to train the neural network 110.

Adjusting scores at inference time is described in more detail below with reference to FIG. 3.

The system 150 then selects one or more highest scoring categories according to the adjusted scores (instead of the scores generated by the neural network 110) as the classification for the input 152. Thus, the classification output 154 identifies one or more highest scoring categories according to the adjusted scores rather than directly using the scores generated by the neural network 110.

Figure 2:
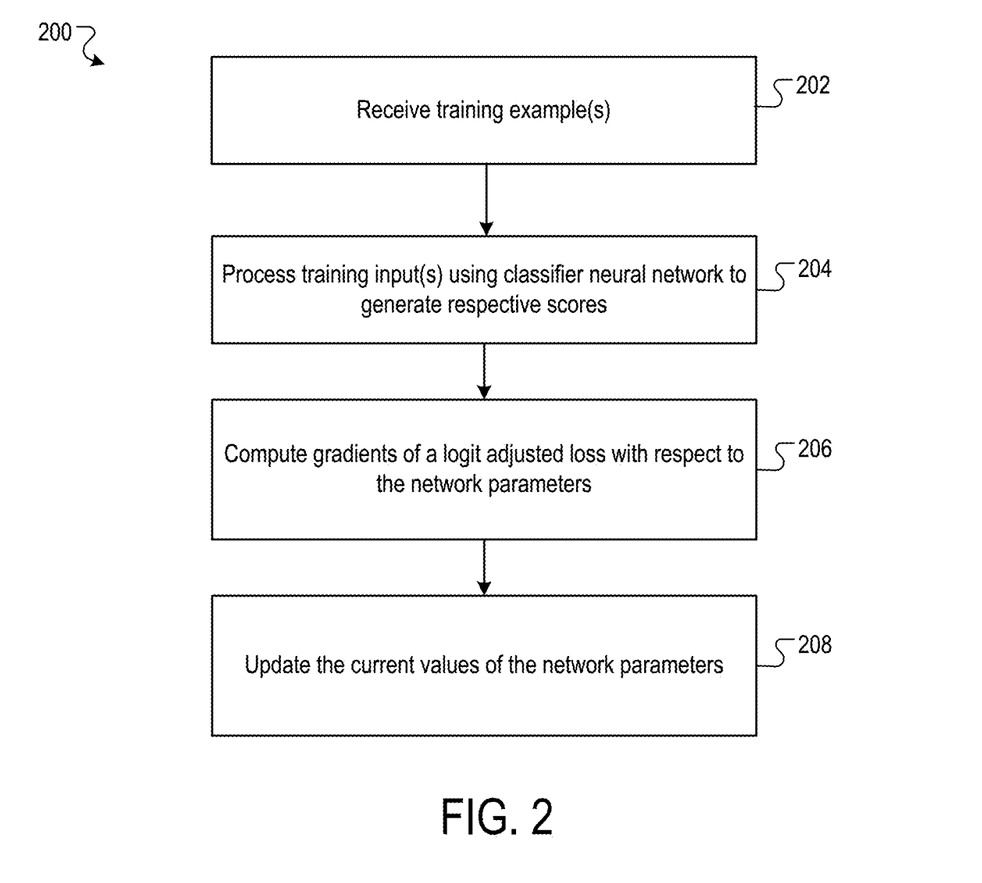
FIG. 2 is a flow diagram of an example process for training a classifier neural network.

FIG. 2 is a flow diagram of an example process 200 for training a classifier neural network. For convenience, the process 200 will be described as being performed by a system of one or more computers located in one or more locations. For example, a training system, e.g., the training system 100 of FIG. 1, appropriately programmed in accordance with this specification, can perform the process 200.

The system can repeatedly perform the process 200 on different batches of training examples to train the classifier neural network, i.e., to determine trained values of the network parameters of the neural network.

The system obtains a batch of one or more training examples (step 202).

Each training example includes a training input and a label for the training input that identifies a ground truth category for the training input. In particular, the system can sample the batch of one or more training examples from a set of training data for training the classifier neural network.

As described above, the training data generally has a long-trail distribution, with most categories in the set of categories having only a few training examples in the training data and a large number of the training examples in the training data being in one of a small subset of the categories.

The system can use any appropriate sampling technique to sample the batch from the set of training data. For example, the system can sample a fixed number of training examples uniformly at random from the set of training data. As another example, the system can sample the training examples using over-sampling or under-sampling.

For each training example in the batch, the system processes the training input in the training example using the classifier neural network and in accordance with current values of the network parameters to generate a respective set of scores for each training input. The set of scores for each training input includes a respective score ("logit") for each of the plurality of categories (step 204).

The system determines, e.g., through backpropagation, gradients of a logit adjusted loss function with respect to the network parameters (step 206).

Generally, the logit adjusted loss function measures, for each training example, the cross entropy loss between (i) a first probability distribution that assigns a probability of one to the ground truth category in the training example and a probability of zero to all other categories and (ii) a second probability distribution. The second probability distribution is generated from a set of adjusted scores for each of the plurality of categories that have been generated using prior probability estimates for the categories and the set of scores for the training input in the training example that were generated by the classifier neural network.

For example, the loss function can be the sum or the average of the cross-entropy losses for the training examples in the batch.

Optionally, the loss function can also include one or more other terms, e.g., regularization terms or auxiliary loss terms.

More specifically, the second probability distribution is generated by applying a softmax function to the adjusted scores to generate a respective probability for each of the categories.

The adjusted score for any given category is generated from (i) the respective score for the category generated by the classifier neural network and (ii) the prior probability estimate for the category. For example, the adjusted score for the given category can be equal to or directly proportional to the sum of the respective score for the given category and a term that is derived from the prior probability estimate for the category.

As a specific example, the adjusted score for a given category y can be equal to:

$$f_y(x) + \tau \log(\pi_y),$$

where $f_y(x)$ is the respective score for the given category y generated by the classifier neural network f by processing the training input x, $\tau$ is a positive value, and $\pi_y$ is the prior probability estimate. The value of $\tau$ can be fixed prior to training or can be determined using any appropriate hyperparameter tuning technique, e.g., random search or grid search.

Thus, in this specific example, the cross entropy loss l for a training example that includes a training input x and label that identifies a ground truth category y can satisfy:

$$l = -\log \frac{e^{f_y(x) + \tau \log \log(\pi_y)}}{\sum_{y' \in [L]} e^{f_{y'}(x) + \tau \log \log(\pi_{y'})}} = \log\left[1 + \sum_{y' \neq y} \left(\frac{\pi_{y'}}{\pi_y}\right)^\tau e^{(f_{y'}(x) - f_y(x))}\right],$$

where [L] is the set of the plurality of categories, and y'≠y denotes that the sum is over all of the y' in [L] other than the ground truth category y.

The prior probability estimate $\pi_y$ for a category y can be determined based on the distribution of the training data, i.e., based on how many training examples in the training data are in each of the categories. Generally, the prior probability estimate is higher for categories that have larger numbers of training examples than for categories that have smaller numbers of training examples.

As a particular example, the prior probability estimate for a given category can be equal to the ratio of (i) the number of training examples in the training data that are in the category to (ii) the total number of training examples in the training data.

As another particular example, the prior probability can incorporate a smoothing factor that "smooths" the prior probability estimates, e.g., to account for certain categories having very few examples. In this example, the prior probability estimate for a given category can be equal to the ratio of (i) the sum of the smoothing factor and the number of training examples in the training data that are in the category to (ii) a value derived from the smoothing factor and the total number of training examples in the training, where the smoothing factor is a positive constant value. The value derived from the smoothing factor can be, e.g., the sum of the smoothing factor and the total number of training examples or the sum of the total number of training examples and a product between a total number of categories and the smoothing factor.

As another particular example, the system can compute the prior probability estimates based on the distribution of the training data through Bayesian estimation.

The system updates the current values of the network parameters using the gradients (step 408). In particular, the system updates the current values by mapping the gradients to an update using an appropriate optimizer, e.g., Adam, rmsProp, Adafactor, SGD, and then applying the update, e.g., adding the update to or subtracting the update from, the current values of the network parameters.

Figure 3:
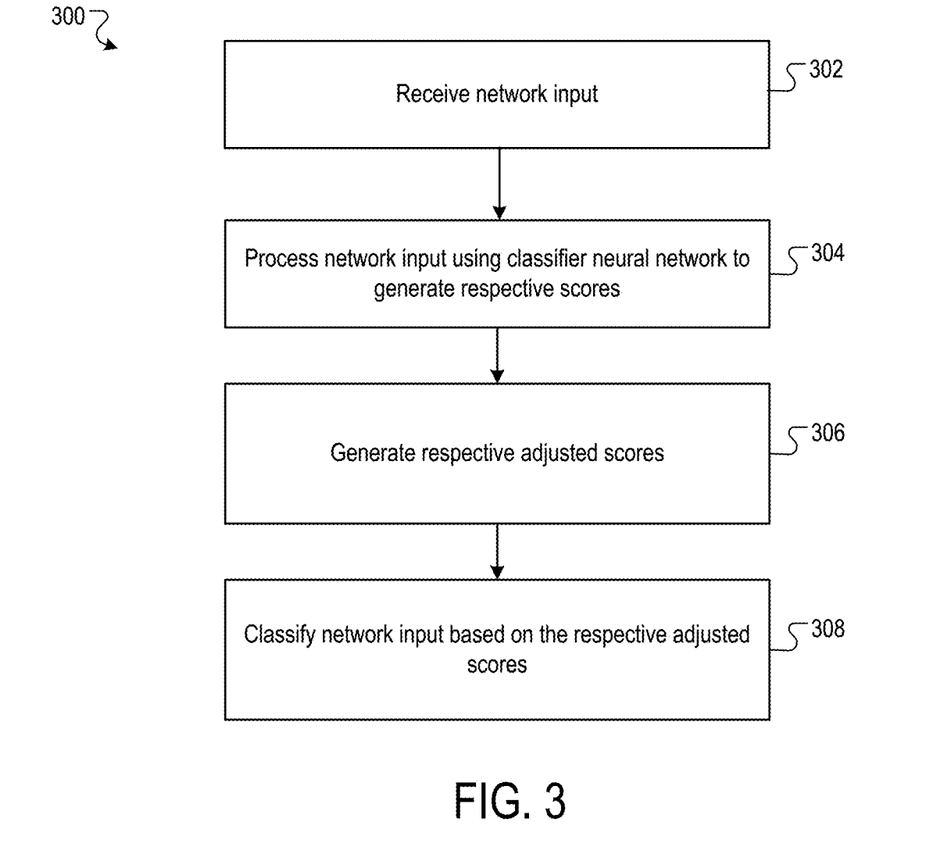
FIG. 3 is a flow diagram of an example process for classifying a new input.

FIG. 3 is a flow diagram of an example process 300 for performing inference using a classifier neural network. For convenience, the process 300 will be described as being performed by a system of one or more computers located in one or more locations. For example, an inference system, e.g., the inference system 100 of FIG. 1, appropriately programmed in accordance with this specification, can perform the process 300.

The system can perform the process 300 for each new network input that is received after the classifier neural network has been trained in order to classify the network input using the trained classifier neural network. In some cases, the system can perform the process 300 in parallel for each network input in a batch of multiple network inputs to classify each network input in the batch.

The system receives a network input (step 302).

The system processes the network input using the trained classifier neural network to generate a set of scores for the network input (step 304). The set of scores includes a respective score for each of the multiple categories. The classifier neural network has been trained on a set of training data that includes multiple training examples in each of the multiple training examples. For example, the neural network can have been trained on the training data to minimize a conventional cross-entropy-based loss function.

The system generates, for each of the categories, a respective adjusted score for the category from the (i) the respective score for the category generated by the classifier neural network and (ii) a prior probability estimate for the category (step 306).

For example, the adjusted score for the given category can be equal to or directly proportional to a difference between the respective score for the given category and a term that is derived from the prior probability estimate for the category.

As a specific example, the adjusted score for a given category y can be equal to:

$$f_y(x) - \tau \log(\pi_y),$$

where $f_y(x)$ is the respective score for the given category y generated by the classifier neural network f by processing the network input x, $\tau$ is a positive value, and $\pi_y$ is the prior probability estimate.

In some cases, the value of $\tau$ is pre-configured, e.g., equal to 0.5, one, or two.

In some other cases, the system can determine the value for r by obtaining a holdout data set, e.g., a set of examples that each include a network input and a label for the network input. In some cases, the holdout data set is disjoint from the training data set used to train the classifier. The system then determines the value of t as the value that minimizes a balanced error of the adjusted scores on the holdout data set, e.g., as determined through conventional optimization techniques. The balanced error is equal to the average of the error rates for each of the plurality of categories, where the error rate for a given category is the rate at which the classifier misclassifies examples that are in the given category (when classifying using the adjusted scores), i.e., the fraction of the examples in the category for which the adjusted score for the given category is not the highest adjusted score for any of the categories.

The prior probability estimate $\pi_y$ for a category y can be determined based on the distribution of the training data that was used to train the classifier neural network, i.e., based on how many training examples in the training data are in each of the categories. Generally, the prior probability estimate is higher for categories that have larger numbers of training examples than for categories that have smaller numbers of training examples. As a particular example, the prior probability estimate for a given category can be equal to the ratio of (i) the number of training examples in the training data that are in the category to (ii) the total number of training examples in the training data.

The system selects one or more categories having the highest adjusted scores as the classification for the network input (step 308). That is, the system classifies the network input using the adjusted scores instead of directly classifying the network input using the scores generated by the classifier neural network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    obtaining training data comprising a plurality of training examples, each training example including a training input and a label for the training input that identifies a ground truth category for the training input from a plurality of categories; and
    training a classifier neural network on the training data, the classifier neural network having a plurality of network parameters and the training comprising repeatedly performing operations comprising:
        obtaining a batch of one or more training examples from the training data;
        for each training example in the batch, processing the training input in the training example using the classifier neural network and in accordance with current values of the network parameters to generate a set of scores for the training input that includes a respective score for each of the plurality of categories;
        for each training example in the batch, generating a respective adjusted score for each of the plurality of categories, wherein the respective adjusted scores are calculated based on respective prior probability estimates for each of the plurality of categories and the set of scores generated for the training input in the training example, and wherein the respective prior probability estimates for the categories are determined based on a distribution of the training data;
        determining gradients of a logit adjusted loss function with respect to the network parameters, wherein the logit adjusted loss function measures, for each training example in the batch, a cross entropy loss between (i) a first probability distribution that assigns a probability of one to the ground truth category for the training input in the training example and a probability of zero to all other categories in the plurality of categories and (ii) a second probability distribution, wherein the second probability distribution is generated from the respective adjusted scores for each of the plurality of categories; and
        updating the current values of the network parameters using the gradients.

2. The method of claim 1, wherein the respective prior probabilities for each of the categories are determined based on how many training examples in the training data are in each of the categories.

3. The method of claim 2, wherein the respective prior probability estimate is higher for categories that have larger numbers of training examples than for categories that have smaller numbers of training examples.

4. The method of claim 2, wherein the respective prior probability estimate for a given category is equal to a ratio of (i) a number of training examples in the training data that are in the given category to (ii) a total number of training examples in the training data.

5. The method of claim 1, wherein the adjusted score for a given category y is equal to:

$$f_y(x)+\tau\log(\pi_y),$$

where $f_y(x)$ is the respective score for the given category y generated by the classifier neural network f by processing the training input x, $\tau$ is a positive value, and $\pi_y$ is the prior probability estimate.

6. A method performed by one or more computers for classifying an image input using an inference system, the inference system comprising a classifier neural network that has been trained on training data comprising a plurality of image training examples, each image training example including an image training input and a label for the image training input that identifies a ground truth category for the image training input from a plurality of categories, and the method comprising:

receiving, by the inference system, an image input;

processing the image input using the classifier neural network to generate a set of scores for the image input that includes a respective score for each of the plurality of categories;

for each of the plurality of categories, generating, by the inference system, a respective adjusted score for the category from (i) the respective score for the category generated by the classifier neural network and (ii) a prior probability estimate for the category, wherein the prior probability estimate for the category is determined based on a distribution of the training data; and identifying, by the inference system, one or more categories having the highest adjusted scores, wherein each adjusted score was calculated based on the respective score generated by the classifier neural network, and assigning the one or more categories having the highest adjusted scores as a classification for the image input.

7. The method of claim 6, wherein the respective prior probability estimates for each of the categories are determined based on how many image training examples in the training data are in each of the categories.

8. The method of claim 7, wherein the respective prior probability estimate is higher for categories that have larger numbers of training examples than for categories that have smaller numbers of image training examples.

9. The method of claim 7, wherein the respective prior probability estimate for a given category is equal to a ratio of (i) a number of image training examples in the training data that are in the given category to (ii) a total number of image training examples in the training data.

10. The method of claim 6, wherein the adjusted score for a given category y is equal to:

$$f_y(x) - \tau \log(\pi_y),$$

where $f_y(x)$ is the respective score for the given category y generated by the classifier neural network f by processing the image input x, $\tau$ is a positive value, and $\pi_y$ is the prior probability estimate.

11. A system comprising one or more computers and one or more storage devices storing instructions that when executed by the one or more computers cause the one or more computers to perform operations for classifying an image input using an inference system, the inference system comprising a classifier neural network that has been trained on training data comprising a plurality of image training examples, each image training example including an image training input and a label for the image training input that identifies a ground truth category for the image training input from a plurality of categories, and the operations comprising:

receiving, by the inference system, an image input;

processing the image input using the classifier neural network to generate a set of scores for the image input that includes a respective score for each of the plurality of categories;

, for each of the plurality of categories, generating, by the inference system, a respective adjusted score for the category from (i) the respective score for the category generated by the classifier neural network and (ii) a prior probability estimate for the category, wherein the prior probability estimate for the category is determined based on a distribution of the training data; and identifying, by the inference system, one or more categories having the highest adjusted scores, wherein each adjusted score was calculated based on the respective score generated by the classifier neural network, and assigning the one or more categories having the highest adjusted scores as a classification for the image input.

12. The system of claim 11, wherein the respective prior probability estimates for each of the categories are determined based on how many image training examples in the training data are in each of the categories.

13. The system of claim 12, wherein the respective prior probability estimate is higher for categories that have larger numbers of image training examples than for categories that have smaller numbers of image training examples.

14. The system of claim 12, wherein the respective prior probability estimate for a given category is equal to a ratio of (i) a number of image training examples in the training data that are in the given category to (ii) a total number of image training examples in the training data.

15. The system of claim 11, wherein the adjusted score for a given category y is equal to:

$$f_y(x) - \tau \log(\pi_y),$$

where $f_y(x)$ is the respective score for the given category y generated by the classifier neural network f by processing the image input x, $\tau$ is a positive value, and $\pi_y$ is the prior probability estimate.

* * * * *